UNITED STATES PATENT OFFICE.

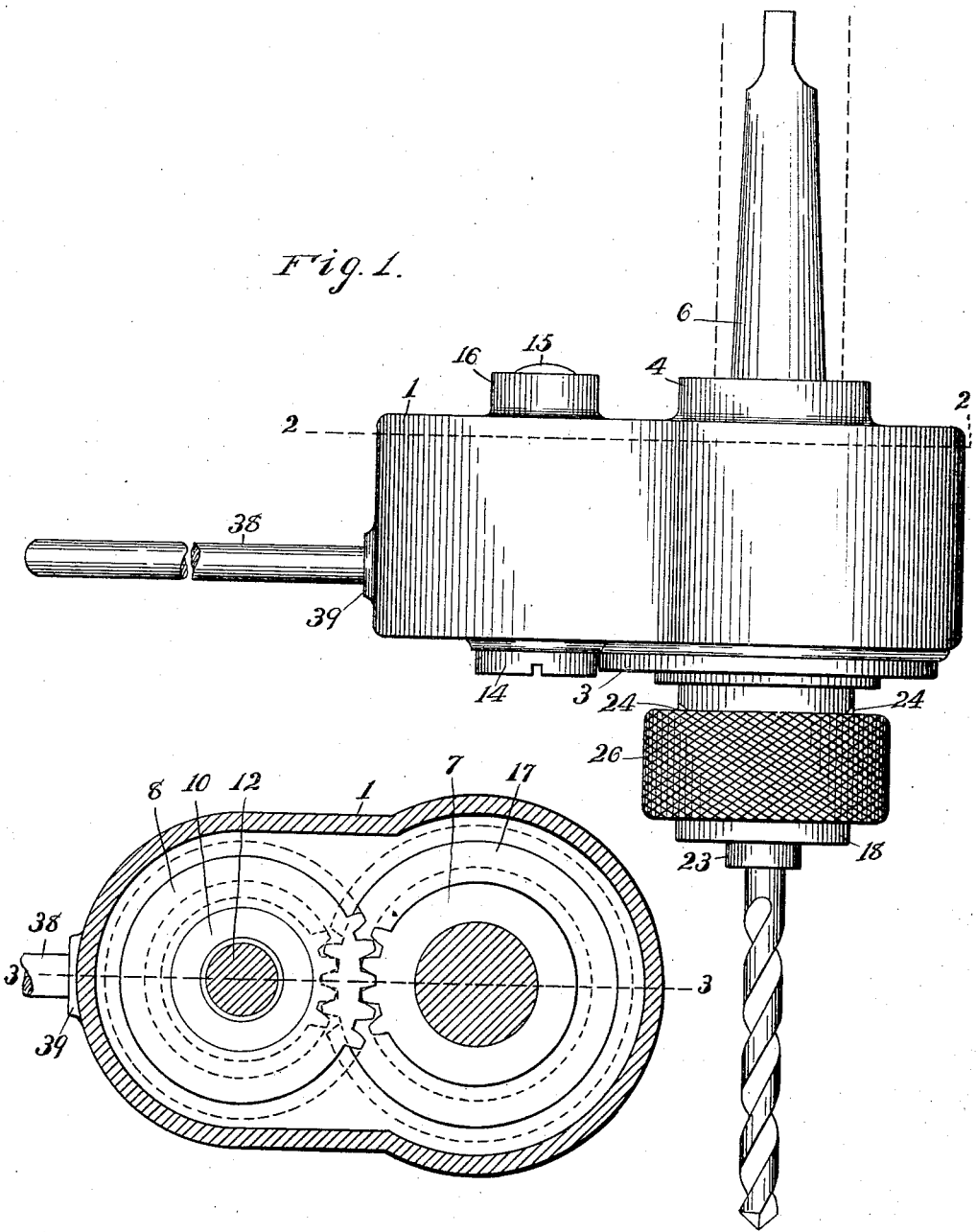

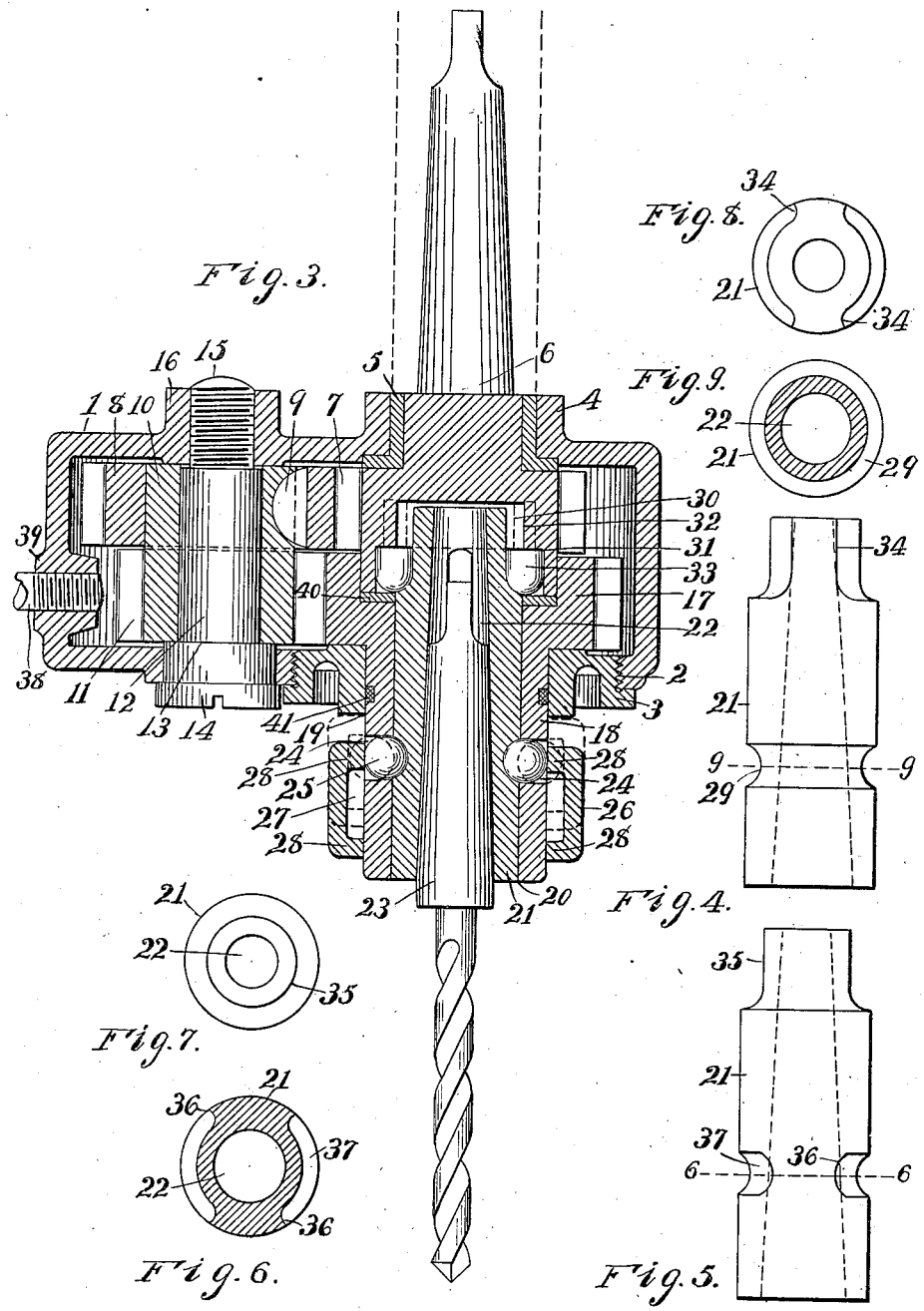

ARNE T. NELSON, OF DETROIT, MICHIGAN.

SPEED-REDUCING CHUCK FOR DRILL-PRESSES.

1,110,455.  Specification of Letters Patent.  Patented Sept. 15, 1914.

Application filed October 11, 1913. Serial No. 794,544.

*To all whom it may concern:*

Be it known that I, ARNE T. NELSON, a citizen of the United States, residing at Detroit, in the county of Wayne, State of Michigan, have invented certain new and useful Improvements in Speed-Reducing Chucks for Drill-Presses; and I do declare the following to be a full, clear, and exact description of the invention, such as will enable others skilled in the art to which it appertains to make and use the same, reference being had to the accompanying drawings, and to the characters of reference marked thereon, which form a part of this specification.

This invention relates to chucks for carrying drills adapted for use in connection with the ordinary or standard single spindle drill presses, and relates particularly to that class of chucks known as "slip chucks," wherein the drill to be chucked may be engaged or disengaged while the spindle of the drill press is in motion, and consists in the construction and arrangement of parts hereinafter more fully set forth and pointed out particularly in the claims.

The object of the invention is to provide simple, efficient and rapid means for chucking standard tapered shank drills of various sizes while the spindle of the drill press is in motion, and at the same time making provision for the reduction of the speed of the drill with relation to the speed of the spindle simultaneously and automatically with the insertion of drills of comparatively large diameter, whereby the utility and efficiency of the ordinary drill press is enhanced through the securing of a changeable speed for driving drills of varying diameters without necessitating the adjustment of gears or the shifting of belts to vary the speed of the drill press in order to secure the proper rate of speed required for the size of the drill to be used.

The above object is attained by the mechanism illustrated in the accompanying drawings, in which:—

Figure 1 is a side elevation of the chuck with drill inserted in position for operation, the spindle of the drill press for receiving the shank of the chuck being indicated by dotted lines. Fig. 2 is a horizontal section through the casing of Fig. 1 on dotted line 2—2. Fig. 3 is a vertical section through the casing and gears of Figs. 1 and 2 taken on dotted line 3—3 of Fig. 2. Fig. 4 is an elevation of a sleeve or collet for receiving the tapered shank of the drill. Fig. 5 is an elevation of a modification of the collet shown in Fig. 4, and is adapted for receiving drills of comparatively large diameter. Fig. 6 is a horizontal section through Fig. 5 on dotted line 6—6. Fig. 7 is an end elevation of the collet shown in Fig. 6. Fig. 8 is an end elevation of the collet shown in Fig. 4. Fig. 9 is a horizontal section through Fig. 4 on dotted line 9—9.

Referring to the drawings by the characters of reference marked thereon, 1 designates a housing or gear case comprising cylindrical end walls joined by top, bottom and side walls, forming an elongated body having a hollow interior for the reception of the driving and transmitting gears, and formed through the bottom wall of the casing 1, concentric with one of the cylindrical ends thereof, is a threaded aperture 2, of sufficient diameter to permit the passage of the gears to the interior of the casing. Closing the aperture 2 is a threaded plug 3, which is screwed tightly into said aperture to effect an oil tight closure with the case. Formed on the upper surface of the casing 1, concentric with the cylindrical end thereof, is a boss 4 in which a flanged bushing 5 is seated, and journaled in said bushing and extending therethrough into the interior of said casing is a shank 6 of standard taper at its upper end adapted to receive the tapered socket in the end of the drill spindle, said spindle being indicated by dotted lines in Figs. 1 and 2. Formed on the lower end of the tapered shank 6, and lying within the housing or casing 1, is a main driving gear 7 which is driven by and travels at the same rate of speed as the spindle of the drill press, and meshing with said gear is a transmitting gear 8 which is contained within the opposite cylindrical end of the gear casing, being keyed at 9 to the sleeve 10 of a second smaller transmitting gear 11 also contained within the casing, both of said gears being journaled to rotate upon a stud bolt 12 which is provided with an enlarged shoulder 13 and a head 14 at one end thereof, and a reduced threaded stem 15 at its opposite end, said bolt passing vertically through the casing 1, and gear 11 engages at its shouldered end 13 with said gear and at its upper end 110 with a screw threaded boss 16 formed on said casing, into which said bolt is tightly screwed, its headed end 14 engaging the under face of the casing, whereby said stud is anchored to said casing and serves as a spindle upon which the gears 8 and 11 may rotate.

Meshing with the transmitting gear 11, and lying within the housing 1, its axis in a line with the axis of the gear 7, is a comparatively large driven gear 17 having a depending sleeve 18 which projects through an aperture 19 formed through the plug 3, in which said gear is journaled to rotate, and extends downward and out of said casing to a point some distance below the under face thereof. It will be readily understood from the foregoing arrangement of gears that power applied to the driving gear will be conveyed through the transmitting gears to the driven gear.

Formed axially through the body of the sleeve 18 and its gear 17 is an aperture 20 for the reception of a collet 21, in the tapered socket 22 of which the tapered shank 23 of the drill is seated and carried, as clearly shown in Fig. 3. Formed diametrically through the wall of the sleeve 18, upon opposite sides and at a point near the lower end thereof, are apertures 24 which are adapted to receive freely the hardened steel balls 25, said balls being held against passage through said apertures by a reduction of the diameter of the apertures at the innermost edge of said sleeve, but are permitted to move freely outward in said apertures. Surrounding the sleeve 18 at its lower end, and movably carried thereon, is a collar 26 having a knurled exterior surface to afford a hand grip and being cored out interiorly, forming a recess 27 in the body thereof, whereby the bearing surface of said collar is reduced to the form of rings or flanges 28 which bear on said sleeve at the upper and lower edge of said collar, the upper flange 28 normally lying in line with the apertures 24 and engaging the outermost peripheries of the balls 25, crowding said balls into their apertures 24 and into an annular concavity 29 formed in the body of the collet 21, whereby said collet is held from disengagement endwise with the aperture 20 in the sleeve of the driving gear. The upper end of said collet projects freely into a shouldered aperture 30 formed axially in the under face of the driving gear 7, and has circumferential locking engagement therein with two downwardly projecting studs 31 which are secured by stems 32 (indicated by dotted lines in Fig. 3) that are seated in the shoulders 33 of the aperture 30. The sides of said studs projecting into the aperture 30 are adapted to engage shoulders 34 at the upper end of the collet, which shoulders are formed by partially cutting away portions of the periphery upon opposite sides at the upper end of said collet, as clearly shown in Figs. 4 and 8, whereby, through the locking engagement of said studs with said shoulders, said collet will be driven by and caused to travel with the driving gear 7 at a rate of speed greater than that traveled by the driven gear 17, through the sleeve of which said collet passes, thus the lower end of the collet will rotate upon the balls 25 contained within the sleeve 18 and lying within the concavity 29 of said collet, whereby the drill carried by said collet will be caused to travel at the same rate of speed as that traveled by the drill press spindle, the transmitting gears merely imparting a slower rotary motion to the sleeve 18 as the collet revolves within it, in which arrangement drills of smaller diameter permitting of higher speed would be employed for use.

To provide for driving drills of larger diameter at a lower rate of speed than that of the drill press spindle, the form of collet illustrated in Fig. 5 is employed, in which the upper end 35 of said collet is reduced in diameter sufficient to lie freely between the engaging studs 31, and around which said studs may revolve. The body of the collet is provided with engaging shoulders 36 which are formed by cutting peripheral concavities 37 upon opposite sides of said collet for the reception of the steel balls 25. When said collet is inserted in the sleeve 18 of the chuck, the balls engaging said shoulders upon opposite sides and being held from disengagement therewith by the slip collar 26 effects a locking engagement between said parts, causing said collet to be driven by and travel at the same rate of speed as that traveled by the gear 17. The ratio of travel between said gear and the driving gear 7 through the transmitting gears is about one to two, whereby the speed of the drill is reduced accordingly.

Either of the forms of collets shown and adapted for carrying drills of large and small diameter may be readily inserted or withdrawn from the chuck while the spindle is in motion by grasping the slip ring 26 and raising it to the position indicated by dotted lines in Fig. 2, when the steel balls will be released and thrown outward by centrifugal force into the recess 27 of said collar, as indicated by dotted lines in Fig. 3, when said collet with its drill may be inserted or withdrawn from the chuck, the slip collar when released again dropping back to its normal position when engaged with said balls.

In order to hold the casing of the chuck from rotating with the spindle of the drill, a stop bar 38 of sufficient length to engage the supporting arm of the drill press is threaded at one end into a boss 39 formed at one end of the casing, whereby said casing is held from rotation, and the gears are caused to transmit power at reduced speed to the collet receiving end of the chuck.

As a means of providing a bearing for the end thrust that would occur between the upper face of the driven gear 17 and the lower extending end of the driving gear 7, a hardened steel ring 40, or other suitable bearing surface, may be interposed between said members, and to prevent the escape of oil between the journal bearing surface of the screw plug 3 and the sleeve 18 of the driven gear, a felt washer or other suitable packing material 41 is embedded in a recess formed in the periphery of said sleeve, as clearly shown in Fig. 3.

Having thus fully set forth my invention, what I claim as new, and desire to secure by Letters Patent, is:

1. A variable speed chuck comprising a gear case, a main driving gear journaled therein and having a shank for connecting with a drill press spindle, transmitting gears journaled in said case, one of which meshes with said driving gear, a driven gear journaled in said case in mesh with one of said transmitting gears and having an apertured sleeve for the reception of a drill collet projecting through said gear case, means carried by said driving gear for engaging said collet, means carried by the sleeve of said driven gear for engaging and disengaging said collet, and means for locking said gear case against rotation.

2. A variable speed chuck comprising a gear case containing a driving gear having a shank for attachment to the spindle of a drill press, a driven gear having a sleeve for the reception of a drill collet, transmitting gears journaled in said gear case and meshing with said driving and driven gears, means carried by said driven gear for effecting a driving engagement with said collet, and means for retaining said gear case against rotation.

3. A drill chuck comprising a case, a shank for connection with a driving spindle journaled in said case, a sleeve having an aperture for the reception of a drill collet extending from said case, means carried by said shank for effecting a driving connection with said drill collet, and means carried by said sleeve for detachably engaging said collet against withdrawal from said sleeve.

4. A drill chuck comprising a case carrying a shank for attachment to the spindle of a drill press, a sleeve journaled in said case and having an aperture for the reception of a drill collet, means carried by said driving shank for effecting a locking engagement with said drill collet, and means carried by said sleeve for engaging and disengaging said collet in contact with, and for withdrawal from said sleeve.

In testimony whereof, I sign this specification in the presence of two witnesses.

ARNE T. NELSON.

Witnesses:
B. F. WHEELER,
M. E. BROESAMLE.